United States Patent [19]

Chen et al.

[11] Patent Number: 5,676,780
[45] Date of Patent: Oct. 14, 1997

[54] METHOD OF MAKING A SINGLE REAR FORK BICYCLE FRAME

[75] Inventors: Yu-Hsuan Chen, Kaohsiung; Rong-Shian Liu, Hsinchu; Chin-I Lin, Tainan Hsien; Gou-Don Chu, Hsinchu, all of Taiwan

[73] Assignee: Industrial Technology Research Institute of Taiwan, Hsinchu, Taiwan

[21] Appl. No.: 445,249

[22] Filed: May 19, 1995

[51] Int. Cl.$^6$ .............. B29C 43/10; B29C 65/02; B32B 5/20; B32B 5/28

[52] U.S. Cl. .............. 156/79; 156/156; 156/245; 156/285; 156/293; 156/304.3; 156/307.1; 264/46.6; 264/250; 264/258; 264/314; 264/515; 264/572

[58] Field of Search .............. 156/245, 307.7, 156/156, 285, 293, 304.3, 307.1, 79; 264/313, 314, 512, 516, 547, 550, 551, 572, 250, 257, 258, 515, 46.6; 280/281.1, 282, 288.3, 284, 288

[56] References Cited

U.S. PATENT DOCUMENTS

| | | |
|---|---|---|
| 4,850,607 | 7/1989 | Trimble . |
| 4,856,801 | 8/1989 | Hollingsworth ............... 280/284 |
| 4,889,355 | 12/1989 | Trimble . |
| 4,902,458 | 2/1990 | Trimble . |
| 4,923,203 | 5/1990 | Trimble et al. .............. 280/281.1 |
| 4,941,674 | 7/1990 | Trimble . |
| 4,982,975 | 1/1991 | Trimble . |
| 4,986,949 | 1/1991 | Trimble . |
| 5,215,322 | 6/1993 | Enders .............. 280/281.1 |
| 5,233,743 | 8/1993 | Robertson et al. .............. 264/314 |
| 5,271,784 | 12/1993 | Chen et al. .............. 156/245 |
| 5,273,303 | 12/1993 | Hornzee-Jones .............. 280/281.1 |
| 5,464,240 | 11/1995 | Robinson et al. .............. 280/281.1 |

*Primary Examiner*—Richard Crispino
*Attorney, Agent, or Firm*—W. Wayne Liauh

[57] ABSTRACT

A composite legal type bicycle frame is disclosed which contains a front frame portion and a rear frame portion. The front frame portion contains a central main and a plurality of legs for connecting the central main with various components of the bicycle, and the rear frame portion contains a rear fork, which consists of a left rear branch and a right rear branch. The left and right rear branches are first cured and glued together at respective abutting surfaces thereof to form an integral rear fork before they are adjoined with the front frame portion, via prepregs and using a cocuring procedure. The left and right rear branches are formed to contain cross-shaped matching protrusion and recess, respectively, on the abutting surfaces thereof, so as to enhance the integrity of the integral rear fork. As a result, a great flexibility of design options can be obtained. For example, the rear fork can be connected to one of the legs but not to the central main. Also, the front frame portion can be designed such that one of the legs is connected indirectly to the central main via another leg, and not directly connected to the central main.

13 Claims, 12 Drawing Sheets

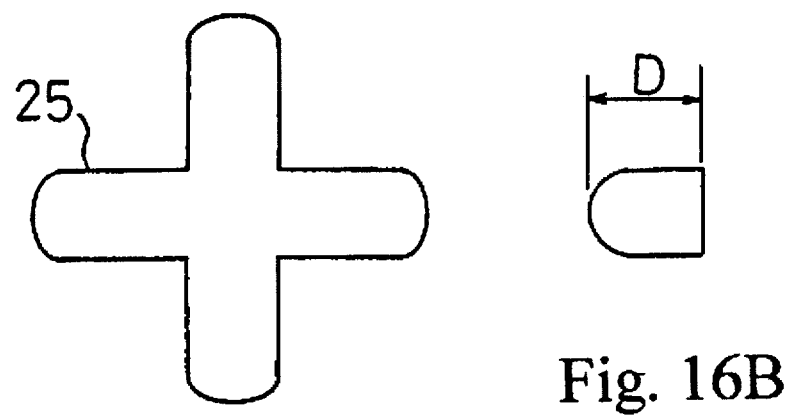
Fig. 16B
Fig. 16A
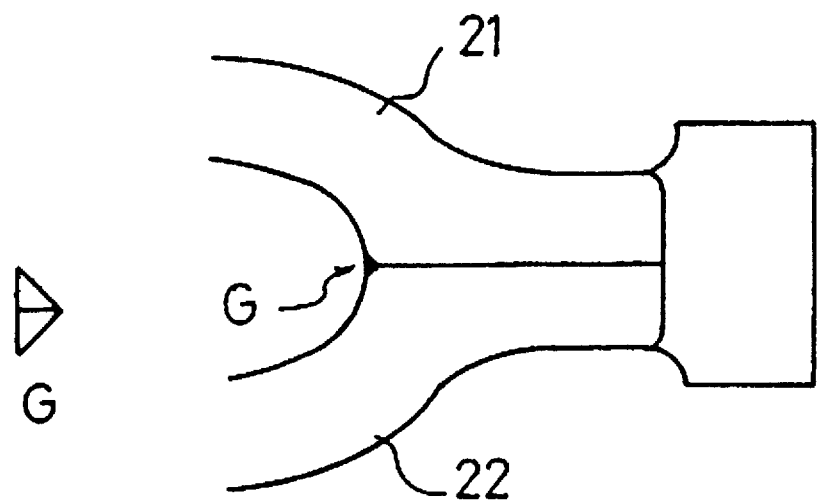
Fig. 17

METHOD OF MAKING A SINGLE REAR FORK BICYCLE FRAME

FIELD OF THE INVENTION

The present invention relates to bicycle frames and the method of making the same. More particularly, the present invention relates to legal type bicycle frames made from composite materials, and method of making the same. Legal type bicycle frames are non-diamond-shaped bicycle frames having a front frame portion, which contains a hollow central main and a plurality of hollow arms connecting between the hollow central main and various support means, such as the steering support means, the seat support means, and the pedal means, respectively, and a rear frame portion, which contains a single rear fork connected to the rear wheel support means.

BACKGROUND OF THE INVENTION

A conventional diamond-shaped bicycle frame comprises a front triangle and a rear triangle. The front triangle comprises (a) a head tube for connecting to the bicycle handle bar and the front wheel assembly; (b) a seat tube having an upper portion connecting to the bicycle seat and a lower portion connected to the pedal support; (c) an upper tube connecting between the head tube and the upper portion of the seat tube; and (d) a lower tube connecting between the head tube and the lower portion of the seat tube.

On the other hand, the rear triangle of the conventional diamond-shaped frame comprises: (a) a left seat staying tube and (b) a right seat staying tube, for connecting between the left upper portion of the seat tube and the left portion of the rear wheel assembly, and the right upper portion of the seat tube and the right portion of the rear wheel assembly, respectfully; and (c) a left chain staying tube and (d) a right chain staying tube, for connecting between the left lower portion of the seat tube and the left portion of the rear wheel assembly, and the right lower portion of the seat tube and the right portion of the rear wheel assembly, respectfully. The left seat staying tube and the right seat staying tube are commonly, and collectively, referred to as the "rear upper fork". And the left chain staying tube and the right chain staying tube are commonly, and collectively, referred to as the "rear lower fork".

One of the shortcomings that have been recognized with the conventional diamond-shaped frame is the relatively large number of tubes and joints that must be provided and welded, brazed or glued together. This is further complicated by the need to connect tubes of various dimensions and materials, thus resulting in time-consuming and relatively labor intensive manufacturing process, and high manufacturing cost.

In order to ameliorate the complexity and reduce the cost associated with manufacturing bicycle frames, the so-called legal-type bicycle frames have been developed which combine the various tubular components of the front triangular flame portion of the traditional diamond-shaped frames into a radiating shape, typically a Y-shaped flame body. And the rear triangular frame portion is reduced to comprise only either a rear lower fork or a rear upper fork, each fork would comprise two branches, one at left, and the other at right, of the rear wheel. Such legal type bicycle frames have a radiating shaped front portion with a single rear fork.

Another approach to simplify the process for manufacturing the traditional diamond-shaped bicycle frames is to use the so-called unitary bicycle frames, which are taught in U.S. Pat. Nos. 4,850,607; 4,889,355; 4,902,458; 4,941,674; 4,982,975; and 4,986,949, the content thereof is expressly incorporated by reference. In the manufacturing of the unitary bicycle flames, no welding or adhesion is required, and the finished bicycle frame does not have abutting joints. The unitary bicycle frames, which are made of composite fibers, are also substantially lighter than metal flames. The unitary bicycle frames involve the disadvantages that they require relatively complicated molds for manufacturing, and the thickness of the finished products often becomes too large resulting in undesirably heavy weight of the finished bicycle frame. Furthermore, because high molding precision is required, the molds are expensive to construct. The unitary molding process typically involves three bulky mold members, which of often could be misaligned, causing errors in the straightness of the finished bicycle frame.

U.S. Pat. No. 4,850,607 discloses a bicycle frame comprising (1) a steering support means for supporting a front fork assembly; (2) a seat support means for supporting a seat assembly; (3) a pedal support means for supporting a pedal crank assembly; (4) a rear wheel support means for supporting a rear wheel assembly; and (5) a hollow unitary frame component extending between at least two of the support means. The hollow unitary frame component comprises at least one hollow junction connected to at least one hollow tube portion. The tube portion comprises at least one elongated strip of resin-impregnated fibrous material and the hollow junction comprises at least one corner patch of the same resin-impregnated fibrous material. The tube strip is integrally united to the corner patch by overlapped edges molded together along a molded juncture to provide a unitary wall integrally uniting the tube portion and the hollow junction. The unitary bicycle frames disclosed in the '607 patent have the advantages that no welding or adhesion is required, and the finished bicycle frame does not have abutting joints. Furthermore, because the unitary bicycle frames are made of composite fibers, they are also substantially lighter than metal frames.

The method disclosed in the '607 patent, however, cannot be applied to the manufacturing of the legal type bicycle frames described above. Because a legal type bicycle frame is constructed with reduced number of components, the dimension of the components must be substantially increased. In short, a legal type bicycle frame is constructed like an octopus (with reduced number of legs); it typically comprises a front frame portion, which contains a hollow central main and a plurality of hollow arms connecting between the hollow central main and various support means, such as the steering support means, seat support means, and pedal means, respectively, and a rear frame portion, which contains either a rear lower fork or a rear upper fork, only. The rear lower or upper fork is not connecting between two support means; rather, it is connected to the front portion. As a consequence, there is no tube portion that extends between at least two of the support means as contemplated in the '607 patent. Thus the fundamentally different design of the legal type bicycle frames renders the method disclosed in the '607 patent largely inapplicable.

In U.S. Pat. No. 4,902,458, which is a continuation-in-part of the '607 patent, it is disclosed a more detailed method for making the hollow unitary bicycle frame. The '458 patent teaches a process which, among other things, comprises the step of forming a tube section comprising at least one elongated strip of fibrous material impregnated with a synthetic resin and two junction sections each comprising at least one patch of fibrous material impregnated with a curable synthetic resin, the junction patches and the tube strip each being separate pieces of the resin impregnated fibrous material such that the sections are separate from each other. Each end of the tube section is overlapped with a junction section to form a hollow shell extending between two support means. Uncured portions of the shell are compressed against the surfaces of a mold by an inflatable bladder routed to the outside through a passageway passing through a metal sleeve. Again, the method disclosed in the '458 is applicable mainly to the manufacturing of the traditional diamond-shaped frames, which are based on a combination of connecting tube sections, it is not applicable to the manufacturing of the legal type bicycle frames, which do not contain connecting tube sections.

In U.S. Pat. No. 4,889,355, which is also a continuation-in-part of the '607 patent, it is disclosed a bicycle frame comprising a hollow unitary frame component extending longitudinally between and connecting at least two of a steering support means, a seat support means, a pedal support means, and a rear wheel support means, and the method of making such unitary frame component. The hollow unitary frame component comprises at least two adjacent wall sections each of which comprises at least one molded layer of fibrous material impregnated with a synthetic resin. The adjacent wall sections are integrally united by at least one integrally uniting juncture comprising a pair of overlapping edges of the adjacent wall sections. The juncture provides a substantially continuous wall of the resin impregnated fibrous material around an interior cavity of the follow unitary frame component. The method disclosed in the '355 patent is also primarily applicable for the traditional diamond-shaped bicycle frames, for which the dimensions of the components in the front triangle and the rear triangle are comparable. For the legal type bicycle frames, because the dimension of the front frame portion is substantially greater than that of the rear frame portion, it is essentially impossible to have an interior cavity which is molded together to cover both the front frame portion and the rear portion in the manner taught by the '355 patent. Furthermore, the process disclosed in the '355 is for making relatively straight tube portions, which are not present in the legal type frames.

In U.S. Pat. No. 4,986,949, which is a divisional application of the '355 patent, it is disclosed a method for making a hollow bicycle frame component by forming at least two wall sections each comprising at least one layer of fibrous material impregnated with s synthetic resin. One part of one of the wall sections is arranged to be placed in opposing relation to a corresponding part of the other of the wall section, and the resin of at least one of the parts is substantially uncured. The wall sections are placed adjacent to each other with the corresponding parts in opposing relations. Thereafter, the opposing parts are transversely overlapped so as to form a hollow shell extending longitudinally between at least two of the support means, including the wheel support means. Again, the method disclosed in the '949 patent is primarily designed for molding relatively slim tubular components by transversely overlapping two slightly-more-than-half wall sections together, it is not suitable for making legal type bicycle frames, which involve a relatively bulky front frame portion. Furthermore, in the legal type bicycle frame, the rear wheel support means is not directly connected to any other support means through the rear frame portion.

In U.S. Pat. No. 4,982,975, which is a divisional application of the '607 patent, it is disclosed a bicycle frame connecting at least two support means of the group consisting of a steering support means, a seat support means, a pedal support means, and a rear wheel support means. The bicycle frame comprises a hollow unitary frame component which extends longitudinally between at least two support means and comprises at least two adjacent wall sections each comprising at least one molded layer of fibrous material impregnated with a synthetic resin. The adjacent wall sections are integrally united by at least one pressure molded juncture to provide a unitary wall of the resin impregnated fibrous material around an interior cavity of the unitary frame component. The pressure molded juncture is formed by overlapping layers of the resin impregnated fibrous material provided by overlapped parts of the adjacent wall sections. The unitary frame component disclosed in the '975 patent involves a tube portion that extends longitudinally and connects between at least two support means; thus, it is applicable only for the traditional diamond-shaped bicycle frames and not for the legal type bicycle frames, which does not involve such a tube portion because of the substantially greater strength required of the frame component.

SUMMARY OF THE INVENTION

The primary object of the present invention is to develop a method for making bicycle frames with reduced weight and improved aerodynamics and stylishness. More specifically, the primary object of the present invention is to develop a process for making legal type bicycle frames from composite materials, which contain fibrous materials impregnated with a synthetic resin. Legal type bicycle frames are non-diamond-shaped bicycle frames having a diversely different front frame portion and a rear frame portion from the traditional diamond-shaped frames. Instead of a front triangle, the legal type bicycle frame contains a hollow central main and a plurality of hollow arms radiating from the hollow central main and connecting between the hollow central main and the various support means, such as the steering support means, seat support means, and pedal support means, respectively. In other words, the various tubular components of the front triangular frame portion of the traditional diamond-shaped frames are combined into a radiating shape, such as Y-shaped, T-shaped, V-shaped, Z-shaped, front flame. The rear frame portion of the legal type bicycle frame contains either a rear lower fork or a rear upper fork, but not both. Each fork comprises two branches, one at left, and the other at right, of the rear wheel. In other words, the rear triangular frame portion of the traditional diamond-shape frames is reduced to comprise only one fork. Because a legal type bicycle frame is constructed with reduced number of components, the dimension of the constituting components must be substantially increased. Furthermore, a legal type bicycle frame, whose appearance resembles that of an octopus (with a reduced number of legs), involves a very different design from the traditional diamond-shaped frames; therefore, a new manufacturing concept is required for making this new type of bicycle frames.

In summary, the present invention discloses a process for making legal type bicycle frames, which comprise a radiating front frame portion and a rear frame portion, which comprises either an upper fork or a lower fork connected to the front frame portion, each of the upper or front fork having left and right rear branches. The process disclosed in the present invention comprises the following steps:

(a) overlaying a plurality of first prepreg layers on a first mandrel to form the uncured left and right rear branches, each of the first prepreg layer contains a fibrous material impregnated with a curable synthetic resin;

(b) removing the uncured left and right rear branches from the first mandrel and heating the uncured left and right rear branches in a first mold to form cured left and right rear branches;

(c) overlapping a plurality of second prepreg layers on a second mandrel assembly to form the uncured front frame portion, which contains a hollow central main and a plurality of hollow legs connected thereto, each of the second prepreg layers contains a fibrous material impregnated with a curable synthetic resin;

(d) removing the uncured front frame portion from the second mandrel assembly;

(e) adjoining the cured left and right rear branches to the uncured front frame portion with a plurality of third prepreg layers, which overlap the uncured front frame portion with at least either of the cured left branch or the right rear branch and, each of the third prepreg layers contains a fibrous material impregnated with a curable synthetic resin;

(f) heating and curing the uncured front frame portion inside a second mold to form a bicycle frame.

The plurality of legs provided to connect the central main with a steering support means, a seat support means, and a pedal support means, respectively; whereas the rear fork connects the central main with a rear wheel support means. In a preferred embodiment, the steering support means is formed by wrapping a steering tube with at least a fourth prepreg layer, the seat support means is formed by wrapping a seat tube with at least a fifth prepreg layer, and the pedal support means is formed by wrapping a pedal tube (i.e., a five-junction tube) with at least a sixth prepreg layer. The steering support means, the seat support means, and the pedal support means are united by the overlapping second prepreg layers. Alternatively, the uncured front frame portion can be formed by overlaying a plurality of long strips or patches of this second prepregs on a plurality of tubes, these tubes are arranged in a radiating manner from said hollow central main to be formed to become part of the legs.

It is preferred that each of the first or second prepreg layers contain 5 to 30 layers, more preferably 8 to 16 layers, of the fibrous material impregnated with a curable resin. An inflatable bladder can be placed inside the cavity of the uncured front frame portion before it is placed into the second mold so as to apply pressure on the prepreg layers during curing. Alternatively, a heat-foamable material can be placed into the cavity of the uncured front frame portion. The volume expansion of the heat-foamable material after heating also similarly exerts a pressure on the prepreg layers against the inner wall of the mold during the curing process.

The process disclosed in the present invention provides great flexibility for an essentially unlimited number of bicycle frame to be designed. Typical legal type frames that can be easily manufactured using the process disclosed in the present invention include the Y-shaped, T-shaped, V-shaped, Z-shaped, front frames, etc. And the overall frame (i.e., after the front frame portion is integrated with the rear frame portion) can be designed to have an X-, cross-, Z-, or ϵ-shape. The process disclosed in the present invention is also extremely flexible which allows a very wide variety of sizes and dimensions of the frame components to be designed and manufactured to accommodate any special need. Furthermore, because the legal type frames involve a substantially reduced number of components and joints, the present invention allows inexpensive bicycles to be manufactured that are very comfort to ride (because of the improved shock- and vertical-impact-absorbing capability of legal type bicycles), easy to manufacture, extremely stylish, sturdy, aerodynamical, and can be tailored to please personal taste.

BRIEF DESCRIPTION OF THE DRAWING

The present invention will be described in detail with reference to the drawing showing the preferred embodiment of the present invention, wherein:

FIG. 16A is a top view of a cross-shaped conjugating protrusion formed on the top side face of one of the two rear branches of the rear frame portion as shown in FIG. 14.

FIG. 16B is a schematic drawing showing the height of the cross-shaped conjugating protrusion as shown in FIG. 16A.

FIG. 17 is a top view of the rear left branch and the rear right branch of the Y-shaped frame as shown in FIG. 14 after they are joined with the five-junction tube (i.e., the pedal tube) of the front frame portion.

FIG. 18A is the cross-sectional view along line 18A—18A of FIG. 18.

FIG. 18B is the cross-sectional view along line 18B—18B of FIG. 18.

FIG. 18C is the cross-sectional view along line 18C—18C of FIG. 18.

FIG. 18D is the cross-sectional view along line 18D—18D of FIG. 18.

FIG. 18E is the cross-sectional view along line 18E—18E of FIG. 18.

FIG. 18F is the cross-sectional view along line 18F—18F of FIG. 18.

FIG. 18G is the cross-sectional view along line 18G—18G of FIG. 18.

FIG. 18H is the cross-sectional view along line 18H—18H of FIG. 18.

DETAILED DESCRIPTION OF THE PREFERRED EMBODIMENT

Figure 1:
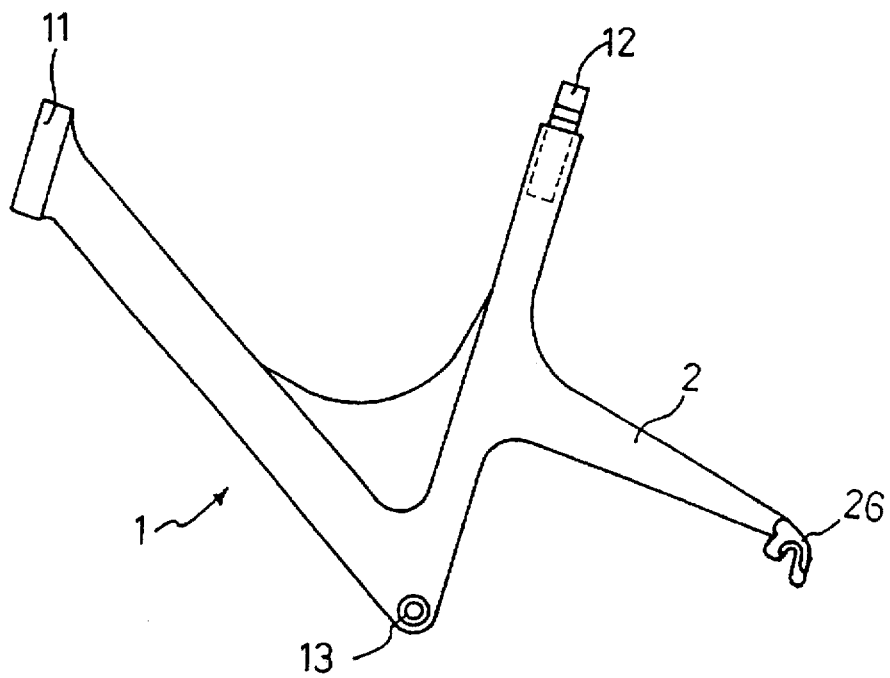
FIG. 1 is a schematic drawing of a preferred embodiment of the present invention with a V-shaped front frame portion; the rear frame portion is connected to the middle between the five-junction tube and the seat tube of the front frame portion.
Figure 2:
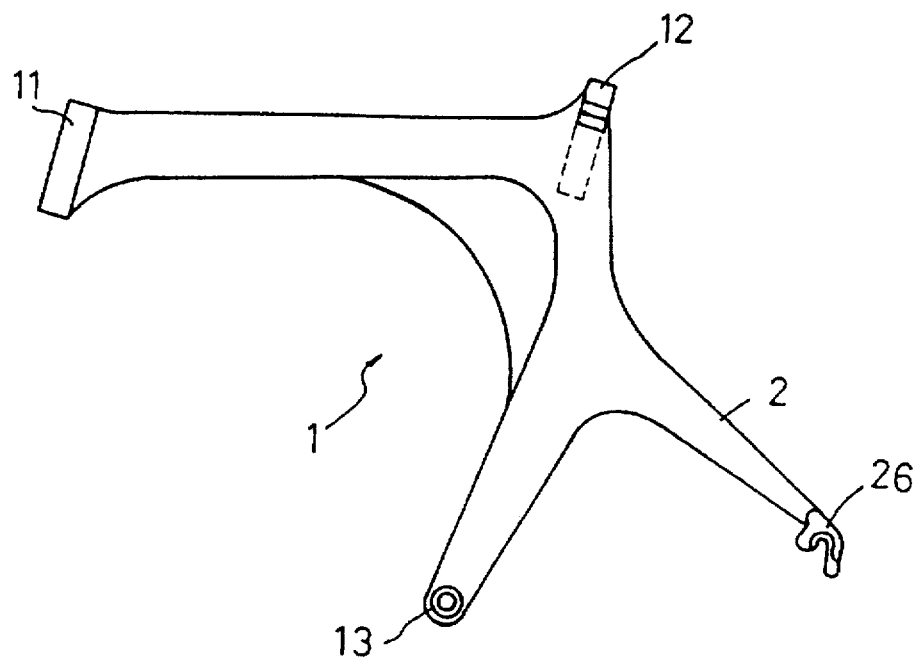
FIG. 2 is a schematic drawing of another preferred embodiment of the present invention with a 7-shaped front frame portion; the rear frame portion is connected to the middle between the five-junction tube and the seat tube of the front frame portion.
Figure 3:
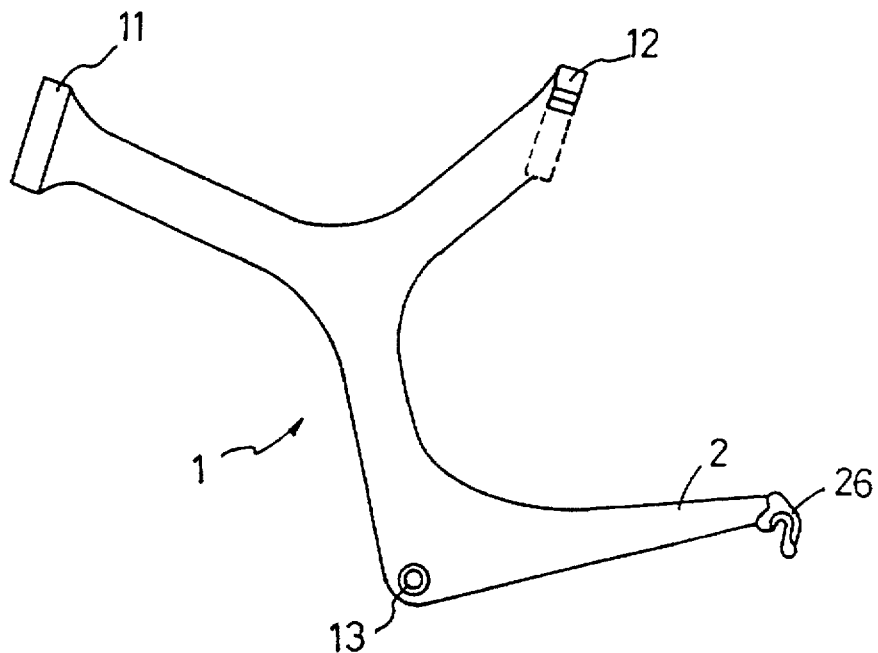
FIG. 3 is a schematic drawing of yet another preferred embodiment of the present invention with a Y-shaped front frame portion; the rear frame portion comprises a rear lower fork.
Figure 4:
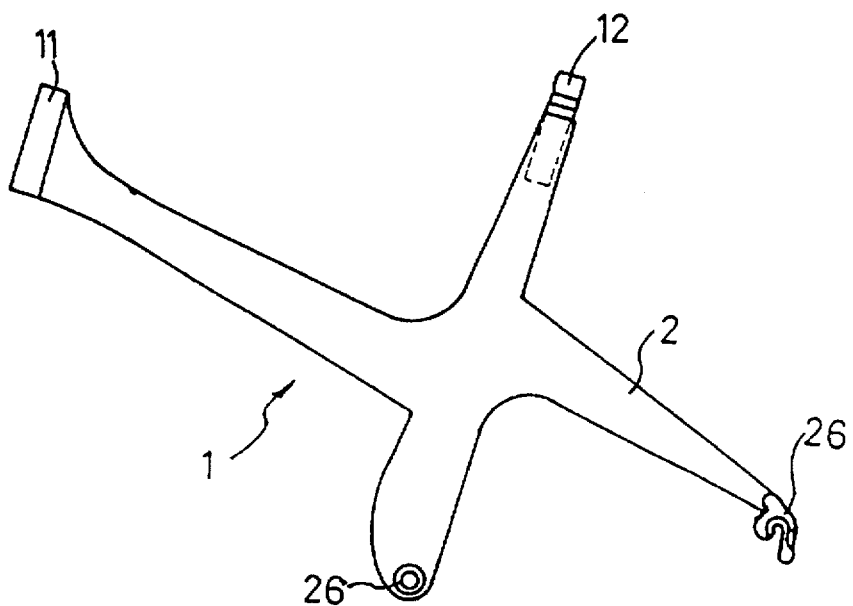
FIG. 4 is a schematic drawing of another preferred embodiment of the present invention with a T-shaped front frame portion; the rear frame portion is connected to the middle between the juncture tube and the seat tube of the front frame portion and the overall frame is shaped like an "X".
Figure 5:
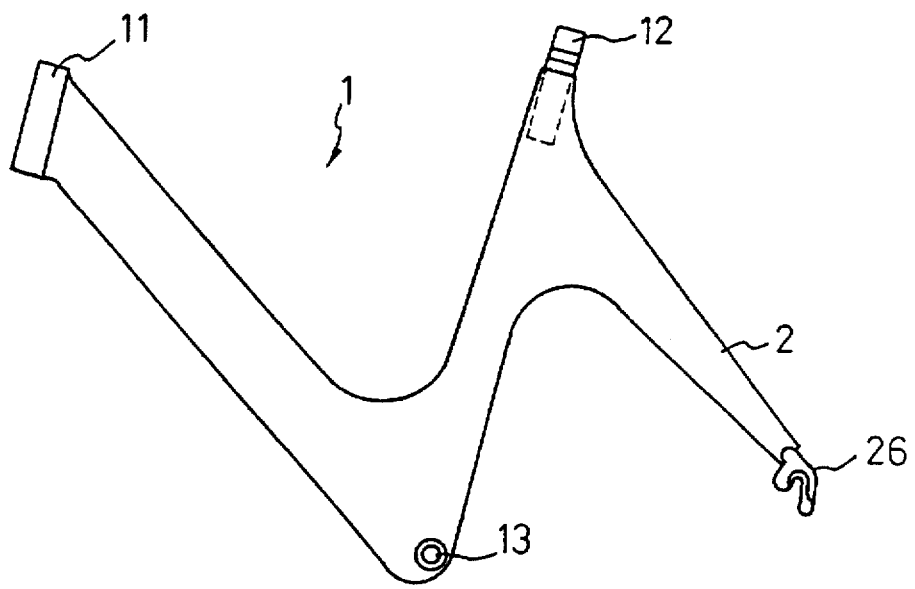
FIG. 5 is a schematic drawing of yet another preferred embodiment of the present invention with a V-shaped front frame portion; the rear frame portion comprises a rear upper fork.
Figure 6:
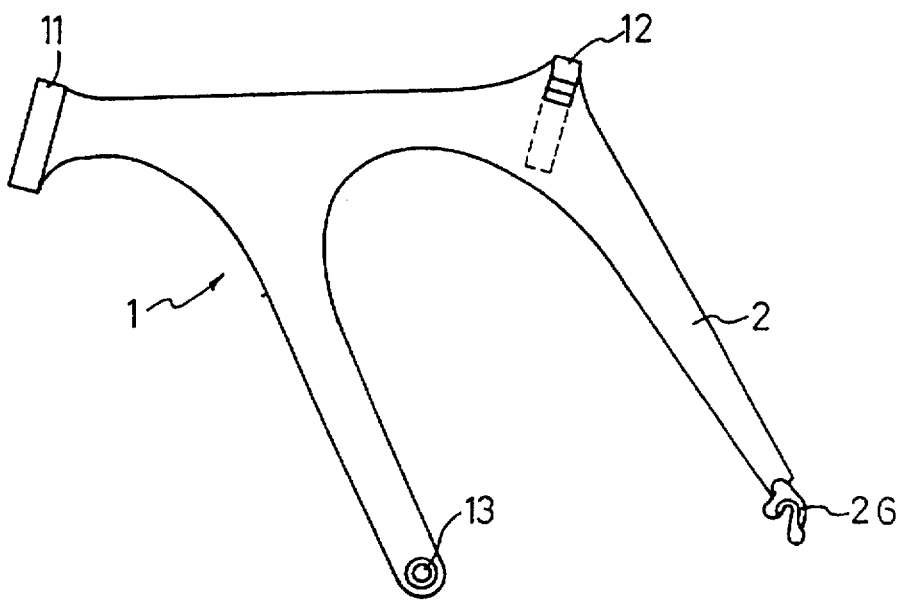
FIG. 6 is a schematic drawing of yet another preferred embodiment of the present invention with another T-shaped front frame portion; the rear frame portion comprises a rear upper fork.
Figure 7:
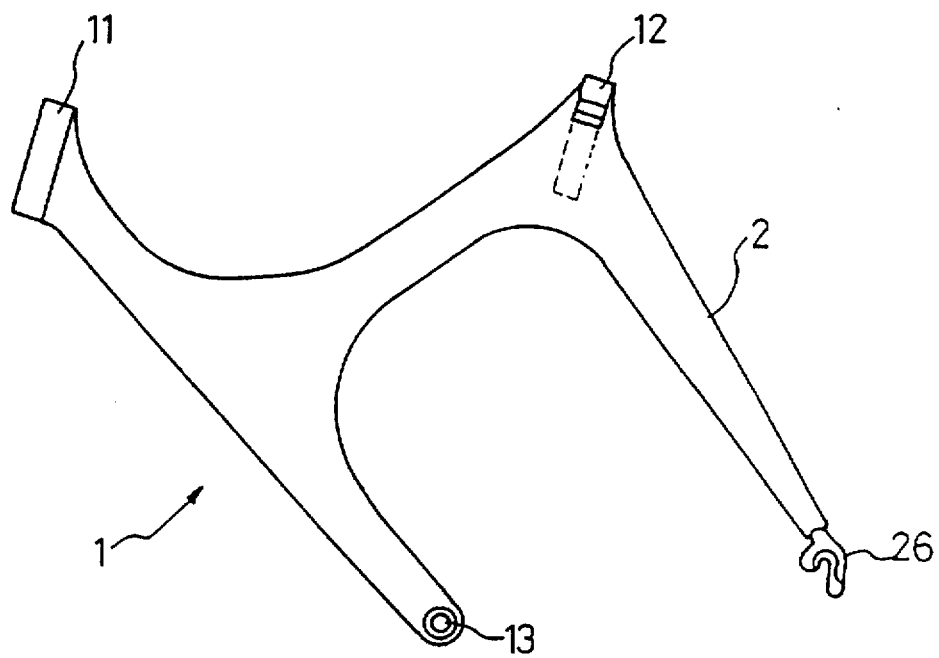
FIG. 7 is a schematic drawing of yet another preferred embodiment of the present invention with yet another T-shaped front frame portion; the rear frame portion comprises a rear lower fork.
Figure 8:
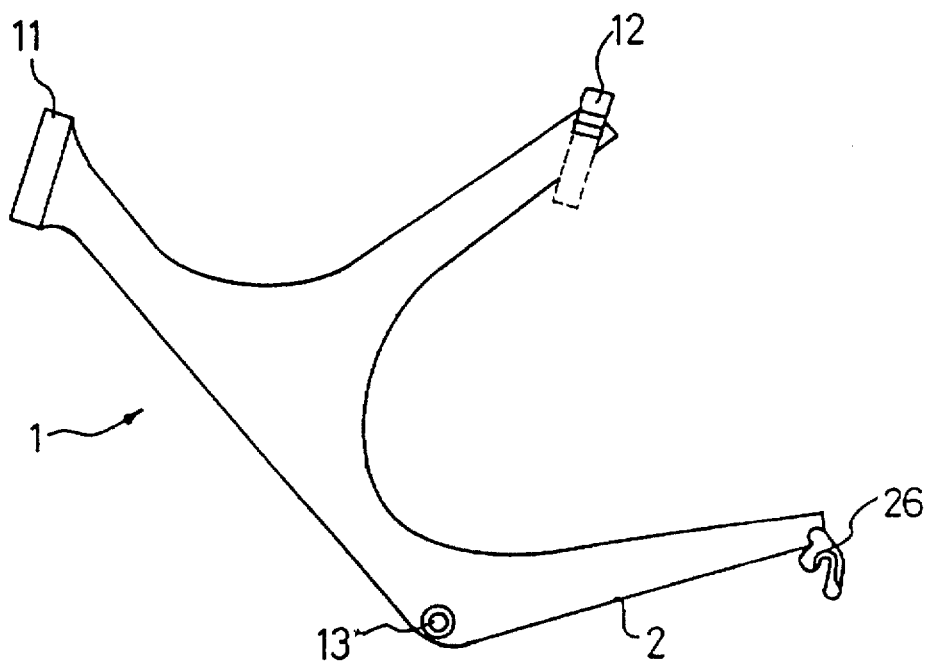
FIG. 8 is a schematic drawing of yet another preferred embodiment of the present invention with yet another T-shaped front frame portion; the rear frame portion comprises a rear lower fork.
Figure 9:
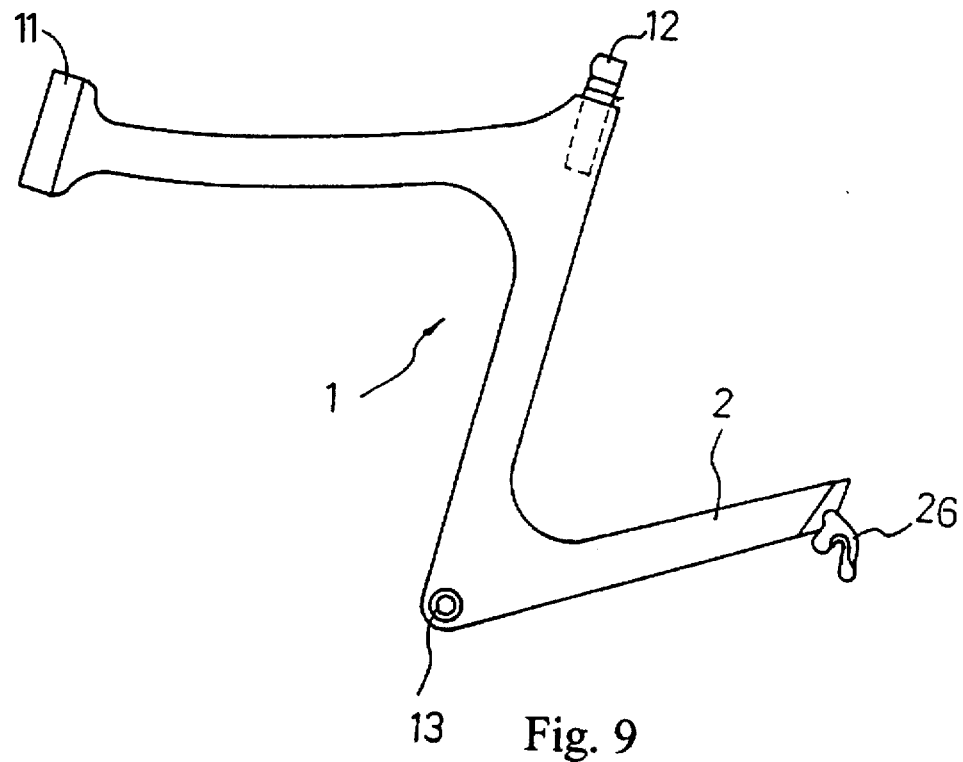
FIG. 9 is a schematic drawing of yet another preferred embodiment of the present invention with aother 7-shaped front frame portion; the rear frame portion comprises a rear upper fork and the overall flame is shaped like a "Z".
Figure 10:
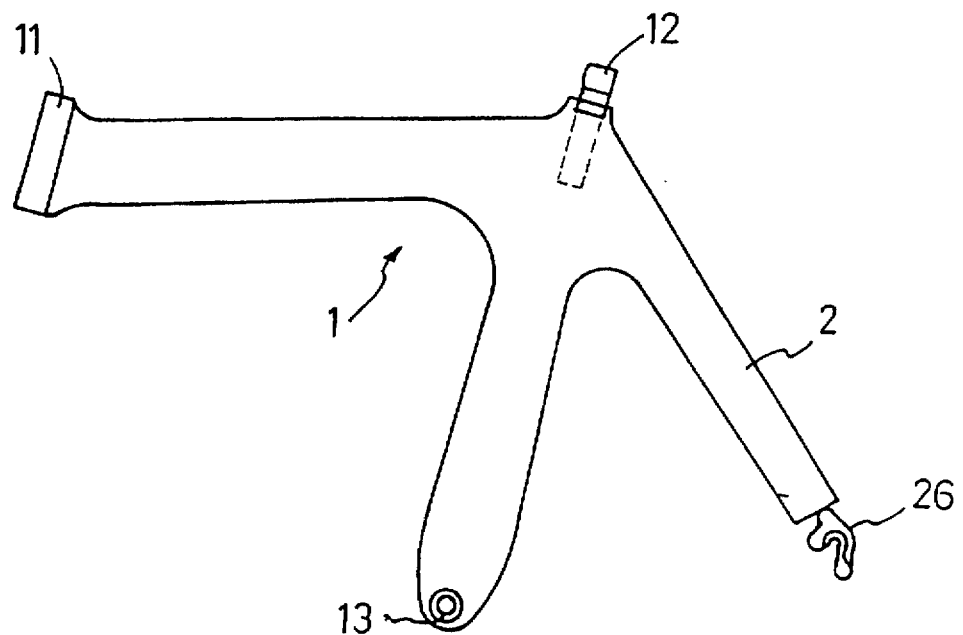
FIG. 10 is a schematic drawing of yet another preferred embodiment of the present invention with yet aother 7-shaped front frame portion; the rear frame portion comprises a rear upper fork.
Figure 11:
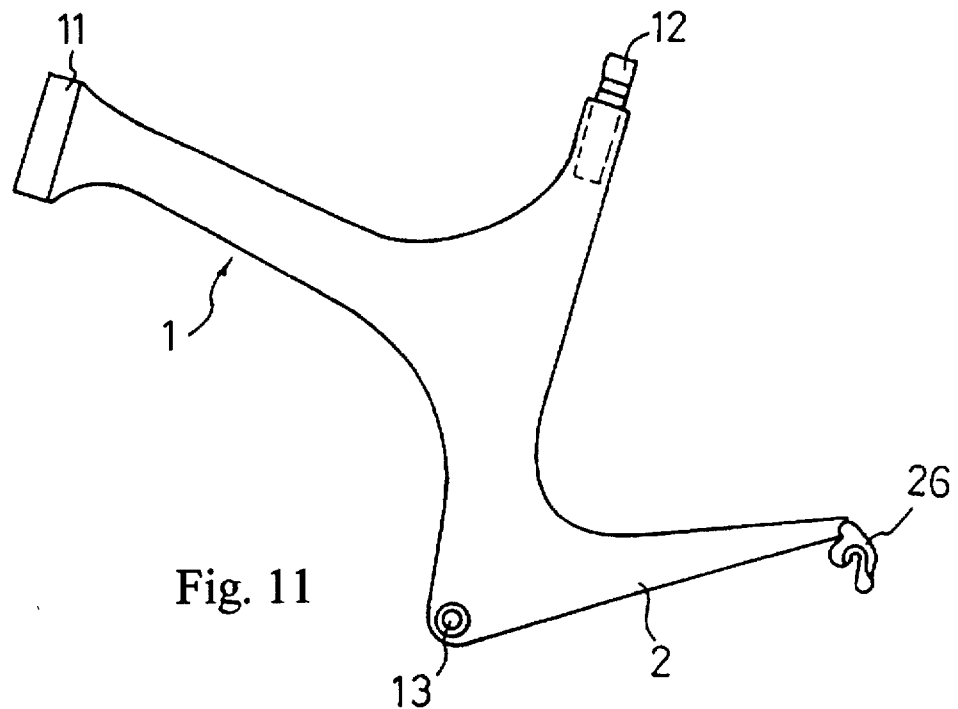
FIG. 11 is a schematic drawing of yet another preferred embodiment of the present invention with yet aother T-shaped front frame portion; the rear frame portion comprises a rear lower fork.
Figure 12:
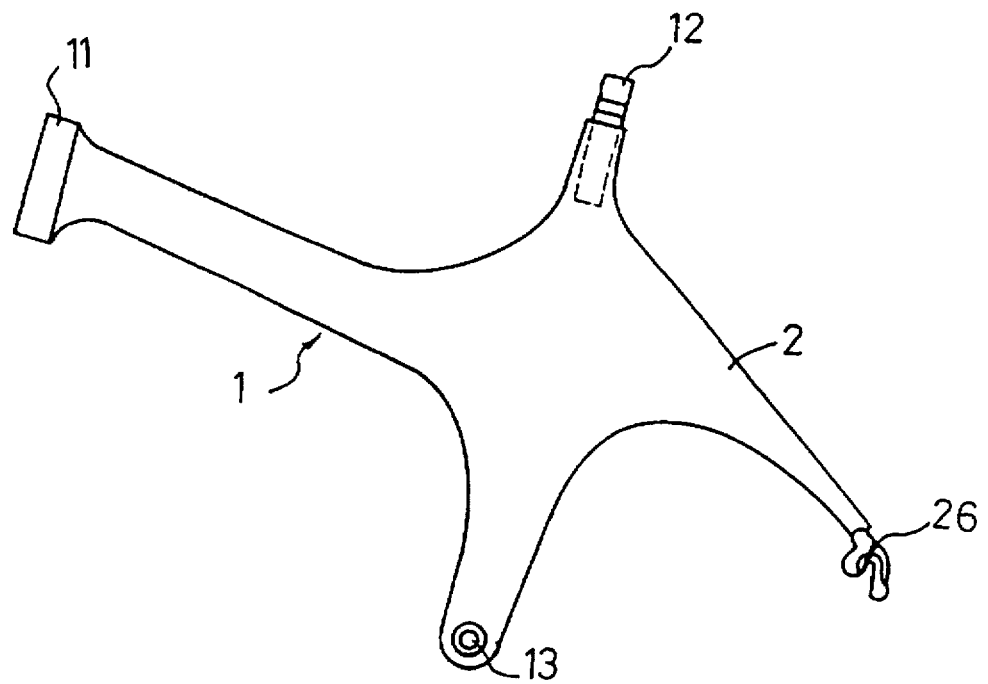
FIG. 12 is a schematic drawing of yet another preferred embodiment of the present invention with yet another T-shaped front frame portion; the rear frame portion comprises a rear upper fork.
Figure 13:
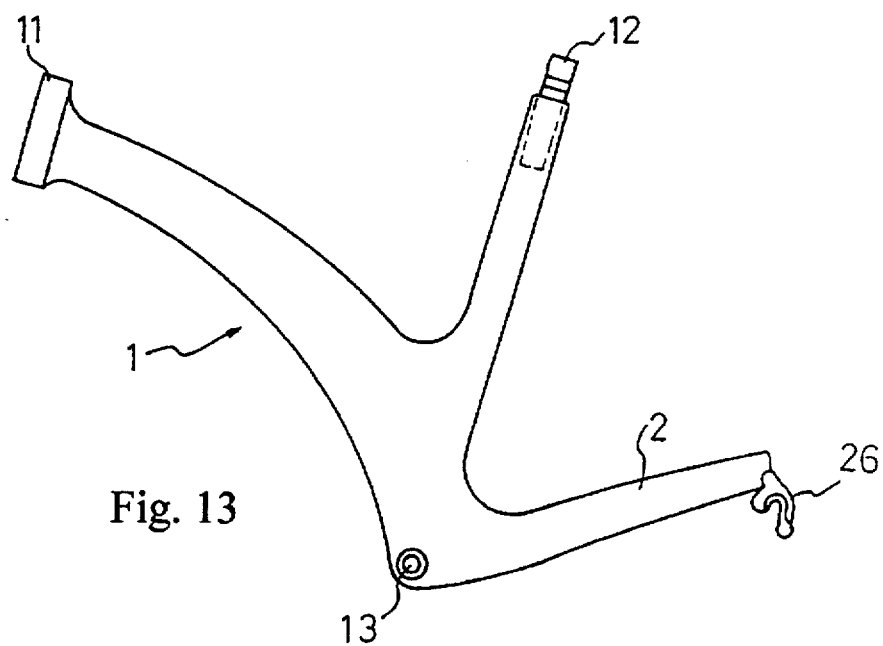
FIG. 13 is a schematic drawing of yet another preferred embodiment of the present invention with an V-shaped front frame portion; the rear frame portion comprises a rear lower fork and the overall flame shapes like an "ϵ".

The present invention discloses a process for making composite legal type bicycle frames, which comprise a radiating front frame portion and a rear frame portion. The rear frame portion comprises either an upper fork or a lower fork connected to the front frame portion, but not both; each of the upper or front fork having left and right rear branches. Legal type bicycle frames differ from the traditional diamond-shaped frames mainly in that the legal type frames do not contain tubular components, which are the principal components of the diamond-shaped frames for connecting between the various support means, such as the steering support means for supporting the front fork assembly; the seat support means for supporting the seat assembly; the pedal support means for supporting the pedal crank assembly; and the rear wheel support means for supporting the rear wheel assembly. Rather, the legal type bicycle frames contain a relatively bulky central main, which connects with the various supporting means in a radiating manner via a plurality of legs, respectively. Because the legal type frames (which resemble an octopus) involve a fundamentally different design from the traditional diamond-shaped frames (which are structured like a latticework) the traditional method for manufacturing composite diamond-shaped frames is not satisfactory, and a new technique needs to be developed so as to produce safe and inexpensive legal type bicycles from composite materials.

The process disclosed in the present invention comprises the following steps: (a) overlapping a plurality of first prepreg layers on a first mandrel to form the uncured left and right rear branches, each of the first prepreg layer contains a fibrous material impregnated with a curable synthetic resin; (b) removing the uncured left and right rear branches from the first mandrel and heating the uncured left and right rear branches in a first mold to form cured left and right rear branches; (c) overlapping a plurality of second prepreg layers on a second mandrel assembly to form the uncured front frame portion, which contains a hollow central main and a plurality of hollow legs connected thereto, each of the second prepreg layers contains a fibrous material impregnated with a curable synthetic resin; (d) removing the uncured front frame portion from the second mandrel assembly; (e) adjoining the cured left and right rear branches to the uncured front frame portion with a plurality of third prepreg layers, which overlap both the cured left and right rear branches and the uncured front frame portion, each of the third prepreg layers contains a fibrous material impregnated with a curable synthetic resin; (f) heating and curing the uncured front frame portion inside a second mold to form a bicycle frame.

It is preferred that the each of the first or second prepreg layers contain 5 to 30 layers, more preferably 8 to 16 layers, of the fibrous material impregnated with a curable resin. An inflatable bladder can be placed inside the cavity of the uncured front frame portion before it is placed into the second mold so as to apply pressure on the prepreg layers during curing. Alternatively, a heat-foamable material can be placed into the cavity of the uncured front frame portion. The volume expansion of the heat-foamable material after heating also creates a pressure on the prepreg layers during the curing process to improve the strength of the cured product.

One of the advantages of the process developed in the present invention is the flexibility; it can be used to produce a variety of bicycle frames such as Y-shaped, T-shaped, V-shaped, Z-shaped, front frames, etc. FIGS. 1 through 14 show but a few examples of the bicycle frames that can be produced using the process disclosed in the present invention. In all these examples, the bicycle frame 10 comprises a front frame portion 1, and a rear frame portion 2. Numerals 11 and 12 indicate head tube and seat tube, respectively, and numeral 13 indicates a five-junction tube (i.e., the pedal support tube), which also provides a support means for the pedal. The process disclosed in the present invention is also extremely flexible which allows a very wide variety of sizes and dimensions of the frame components to be designed and manufactured to accommodate any special needs and preferences.

The present invention will now be described more specifically with reference to the following examples. It is to be noted that the following descriptions of examples, including the preferred embodiment oft his invention, are presented herein for purposes of illustration and description, and are not intended to be exhaustive or to limit the invention to the precise form disclosed.

Figure 14:
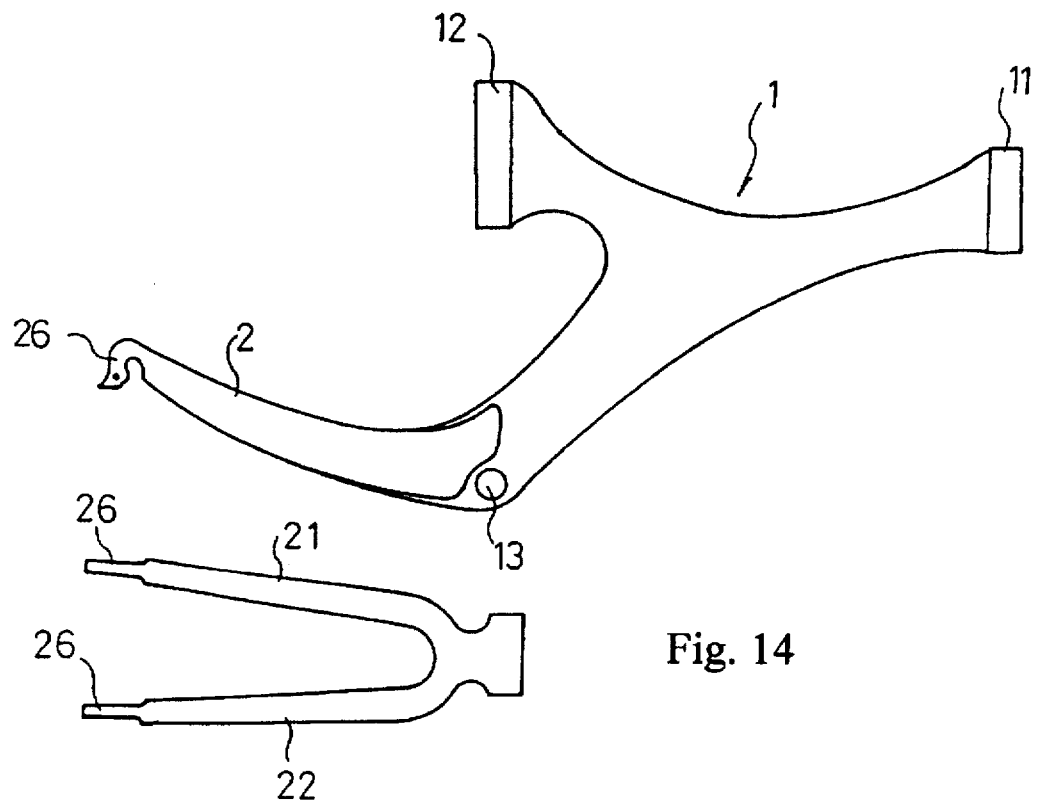
FIG. 14 is a schematic drawing of a legal type bicycle frame with the so-called Y-shaped front flame portion; the rear frame portion comprises a rear lower fork.
Figure 15A:
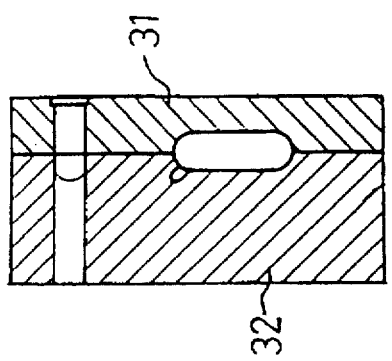
FIG. 15A is a cross-sectional view of the mold as shown in FIG. 15 along line 15A—15A.
Figure 15:
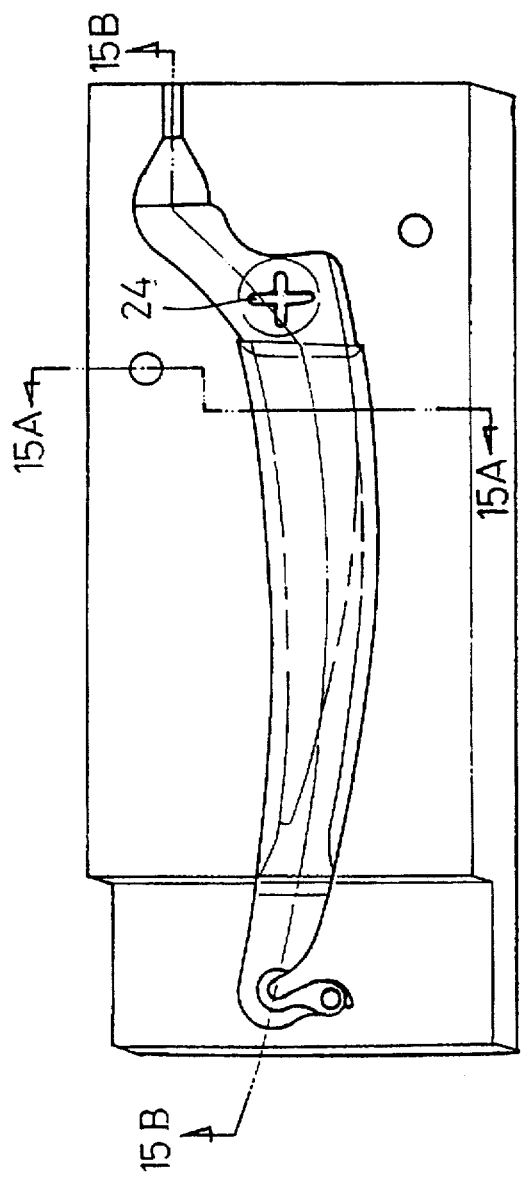
FIG. 15 is a top view of the mold in making the rear lower fork (including the rear left branch and the rear right branch) shown in FIG. 14.
Figure 15B:
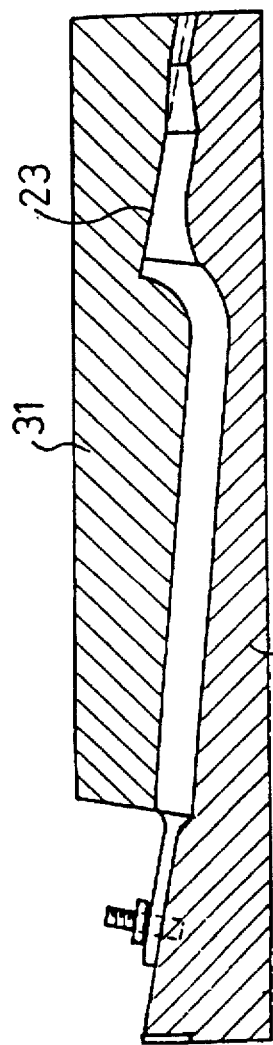
FIG. 15B is a cross-sectional view of the mold as shown in FIG. 15 along line 15B—15B.

As described earlier, the rear frame portion of the legal type frames contains only a rear lower fork or a rear upper fork, but not both. As shown in FIG. 14, each rear fork, whether it be an upper fork or a lower fork, contains a left branch 21 and a right branch 22 in a symmetric relationship relative to each other. The left and right branches of the rear frame portion are connected to the wheel assembly (not shown) via a pair of dropouts 26, respectively. The left and right branches are made by overlaying a plurality of prepreg layers on a mandrel. The mandrel can be made of inexpensive, relatively light and easily separable material such as wood, plastics, rubber, etc. After the mandrel is removed, the uncured branches were placed inside a mold. FIG. 15 is a top view of the mold used for making the rear lower fork shown in FIG. 14. FIGS. 15A and 15B are cross-sectional views of the mold as shown in FIG. 15 along line 15A—15A, and along line 15B—15B, respectively. The mold comprised an upper mold member 31 and a lower mold member 32. An inflatable bladder (preferably made from Nylon) was placed inside the uncured branches so as to apply a pressure, after the mold was closed, during the heat-curing process. FIG. 14 shows that the front frame portion consists of a plurality of legs 101 connected to a central main 100. One of the novel features of the present invention is that the rear fork can be connected to one of the legs but not to the central main.

The abutting surfaces of the left and right branches can be provided with a pair of conjugating (i.e., matching) protrusion and recess, respectively. In a preferred embodiment of the present invention, the protrusion (and the corresponding recess) had a cross (i.e., "+") shape as shown in FIGS. 16A and 16B. The thickness (or depth) of the conjugating cross was about 5 to 10 mm, and its width was about 5 to 25 mm. The size of the cross should preferably be as large as it is permitted by the area of the abutting surfaces. After the right and left branches were cured, they were glued together by an appropriate adhesive. The conjugating protrusion and recess collectively improved the bonding between the abutting surfaces of the two branches. FIG. 17 is a top view of the rear upper branch and the rear right branch of the Y-shaped frame as shown in FIG. 14 after they are joined with the five-junction tube of the from frame portion. As shown in FIG. 17, a 2 mm deep triangular groove was provided at the bottom of the curvature portion encompassing the left and right branches. This triangular groove provided a means for collecting excess glue and helped ensuring a uniform distribution of stress.

Figure 18:
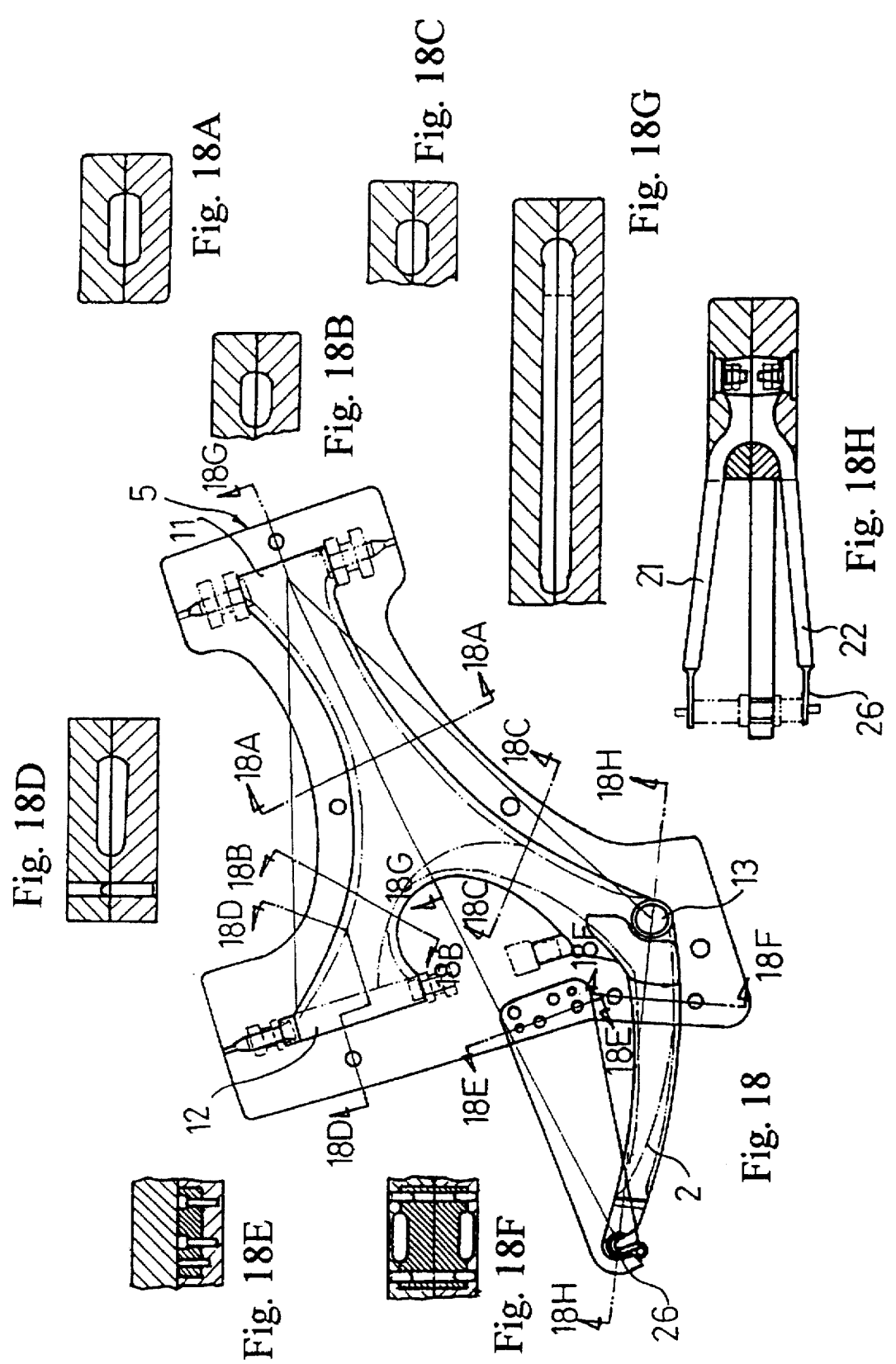
FIG. 18 is a revealed view of the uncured front frame portion with the cured rear frame portion attached thereto, in accordance with the Y-shaped frame as shown in FIG. 14 that has been placed inside a mold.

FIG. 18 is a revealed view of the uncured front frame portion, with the cured rear frame portion attached thereto, in accordance with the Y-shaped frame as shown in FIG. 14 that has been placed inside a mold 5. FIGS. 18A–18H show various cross-sectional views. Prior to being placed inside the mold, the front frame portion 1 was prepared by arranging a head tube 11, a seat tube 12, and a five-junction tube 13, relative to a mandrel assembly (not shown). A plurality of prepreg layers (preferably 5 to 30 layers, more preferably 8 to 16 layers) were overlaid and overlapped about the mandrel assembly and the various tubes, 11, 12 and 13, such that those tubes were buried therein. Thereafter, the mandrel assembly was removed and the uncured front frame portion was placed inside mold 5. The rear frame portion 2, was sleevedly connected to the front frame portion at an appropriate location between the seat tube 12 and the five-junction tube 13. A plurality of prepreg layers were wrapped about the connection, and an overlapped length of at least 4 to 8 cm was provided in this sleeved connection. It is preferred that the prepreg layers are tapered (and their lengths were about 5 to 10 cm) so as to avoid localized stress concentration. In another preferred embodiment, an appropriate film-type adhesive was applied to the sleeved connection to improve the integrity of the adhesion. In a yet another preferred embodiment, 1–2 layers of specially prepared heat-foamable film of epoxy material were applied overlaying the outmost prepreg layers surrounding the five-junction tube and the rear fork portion. The heat-foamable films caused an external pressure to be applied onto the uncured resin opposite the pressure exerted by the inflatable bladder during the curing step to further enhance the structure integrity of the final product. The cured rear fork can be provided to contain a recessed front portion about 2 to 4 cm deep which is sleevedly received by the uncured front frame portion so as to form a flush adjoined external surface.

Figure 19:
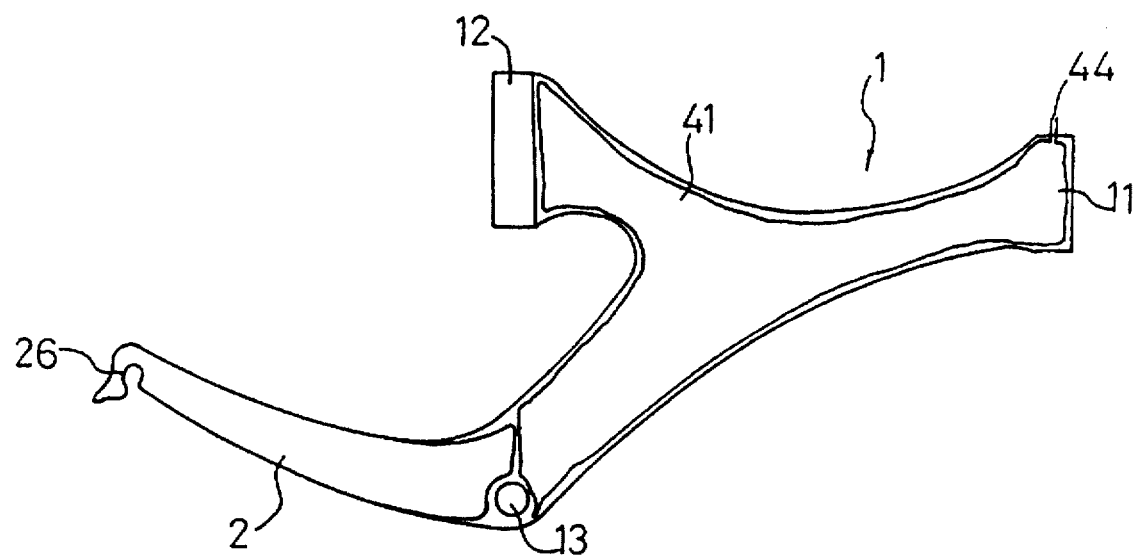
FIG. 19 is a revealed view of an embodiment of the curing/pressurizing operation using the mold of FIG. 18, showing that an inflatable bladder is placed inside the cavity of the uncured front frame portion; the inflatable bladder is connected to an air supply hose entering through the head tube.
Figure 20:
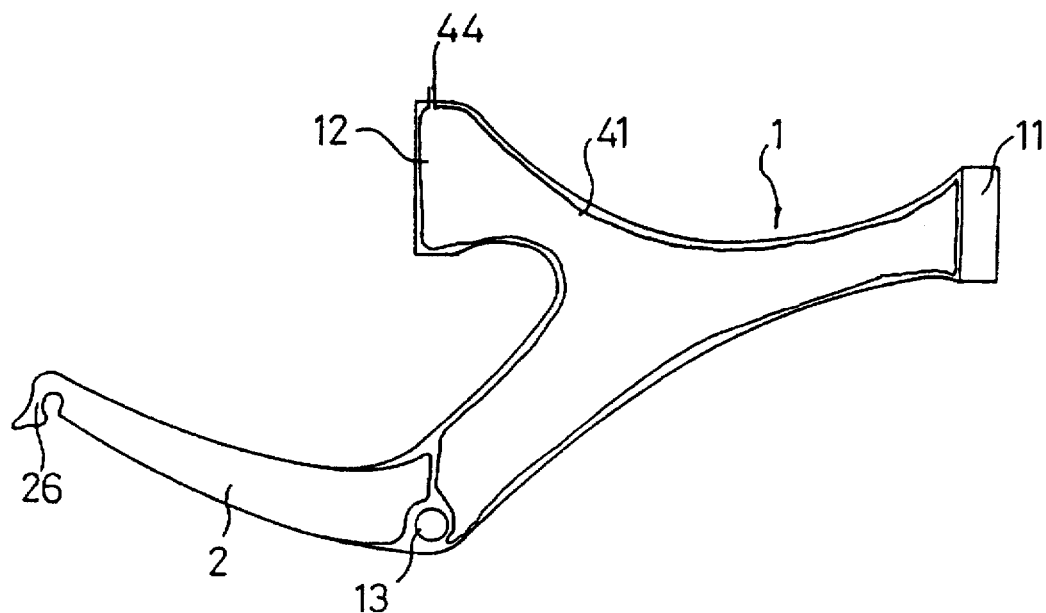
FIG. 20 is a revealed view of another embodiment of the curing/pressurizing operation using the mold of FIG. 18, showing that an inflatable bladder is placed inside the cavity of the uncured front frame portion; the inflatable bladder is connected to an air supply hose entering through the seat tube.
Figure 21:
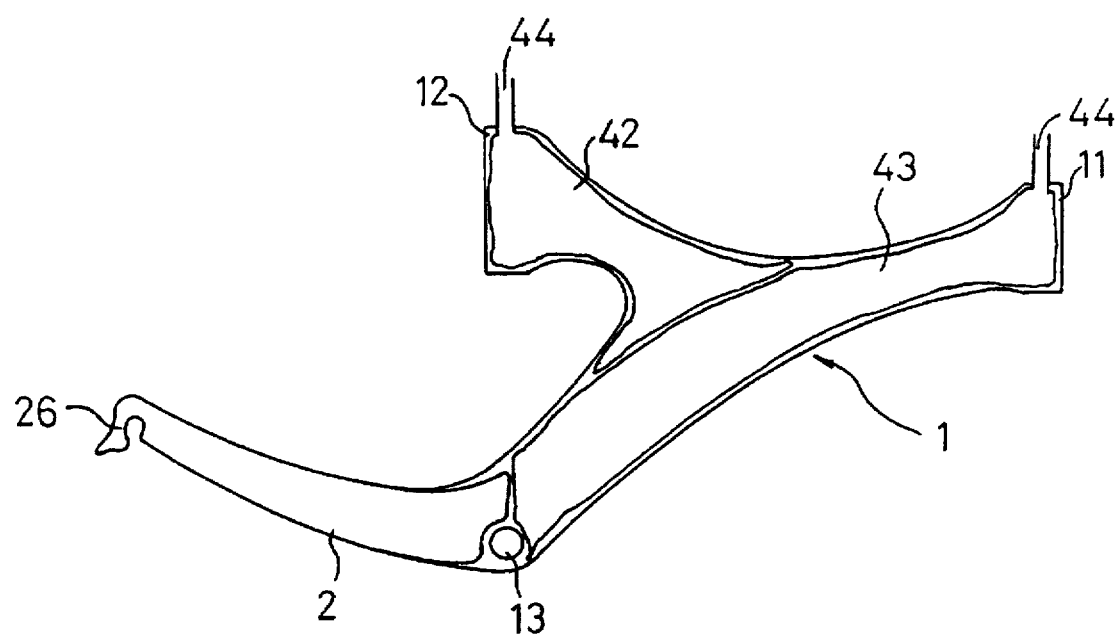
FIG. 21 is a revealed view of yet another embodiment of the curing/pressurizing operation using the mold of FIG. 18, showing that two inflatable bladders are placed inside the cavity of the uncured front frame portion; the inflatable bladders are connected to two air supply hoses entering through the head tube and the seat tube, respectively.

FIG. 19, which is a revealed view of the curing/pressurizing operation using the mold 5 of FIG. 18, shows that an inflatable bladder was placed inside the cavity of the uncured front frame portion 1; the inflatable bladder 41 was connected to an air supply hose 44 entering through the head tube 11. The cured rear frame portion 2 has been sleevedly received by the uncured front frame portion 1 near the five-junction tube 13. Air was supplied via the air supply hose 44 during the curing step to apply a pressure causing the uncured prepregs to be pushed against the inner wall of the mold 5 so as to form a composite bicycle frame. In an alternative embodiment, a heat-foamable material was used to fill the cavity inside the uncured front frame portion. When the volume of the heat-foamable expanded during the heat-curing step, a similar pressure was exerted against the prepregs being cured. FIGS. 20 and 21 are revealed views of two alternative embodiments, respectively, of the curing/pressurizing operation using the mold of FIG. 18. In FIG. 20, the inflatable bladder 41 was connected to an air supply hose 44 entering through the seat tube 12. In FIG. 21, two inflatable bladders 42 and 43 were used which were connected to two air supply hoses 44 entering through the head tube 11 and the seat tube 12, respectively.

A wide variety of prepregs can be used in the present invention to tailor specific needs and applications. Design considerations include flexural strength, rigidity, compressive strength, tensile strength, shock-absorption capability, weight, etc. Typical fibrous materials include glass fiber, carbon fiber, Kevlar fiber, Spectra fiber, etc. Within each type of fibrous materials, there are also degrees of low, medium, or high modulus, etc that can be selected. Some applications may advantageously use a combination of fibers, such as 75/25, 50/50, or 25/75 of carbon/glass fibers.

In the method described above, the left and right rear branches 21 and 22 were bonded together before they were adjoined with the uncured front frame portion. In yet another embodiment, the left and right rear branches can be separately sleevedly adjoined with the uncured front frame portion, before the uncured front frame portion was placed into the mold 5.

The method disclosed in the present invention requires only one rear fork, which contained a left branch and a right branch, and both were pre-molded and cured before fabrication of the entire frame. As a consequence, the three molds required in the present invention, i.e., the molds 31 and 32 for molding left and right branches, 21 and 22, respectively, and the main mold 5, can be greatly simplified and with greatly reduced bulkiness. Furthermore, because only one rear fork 2 was involved in the present invention, it can be adjoined to the front frame portion 1 at essentially any location between the seat tube 12 and the five-junction tube 13. This provides great flexibility in bicycle frame designs, especially in designing bicycle frames that closely follow the best aerodynamic consideration to minimize drag. Furthermore, the single rear fork can be placed at an optimum disposition with minimum interference from the drive chain.

In the process disclosed in the present invention, because the front frame portion was prepared by first overlaying pregregs about a mandrel assembly, then placing the uncured hollow body, along with the seat tube, head tube and pedal tube, inside a mold wherein the prepregs are cured by heat and pressure, great flexibility can also be obtained in the front frame design. Considerations in the front frame design include avoidance or minimizing of interference with the drive chain (in conjunction with an optimum rear fork design), and the reduction of vertical shock to provide riding comfort.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for making single-rear-fork bicycle frames, wherein said single-rear-fork bicycle frame comprises a radiating front frame portion and a rear frame portion, said front frame portion comprises a central main and a plurality of legs radiating therefrom, said rear frame portion comprises a rear fork connected to said front frame portion, said rear fork comprises a left rear branch and a right rear branch; said process comprising the following steps:
    (a) overlaying a plurality of first prepreg layers on a first mandrel to separately form an uncured left rear branch and an uncured right rear branch, each of said first prepreg layers containing a fibrous material impregnated with a curable synthetic resin;
    (b) removing said uncured left and right rear branches from said mandrel and heating said uncured left and right rear branches separately in a first mold to form cured left and right rear branches;
    (c) overlapping a plurality of second prepreg layers to form an uncured front frame portion, which contains a central main and a plurality of hollow legs connected thereto, each of said second prepreg layers containing a fibrous material impregnated with a curable synthetic resin;
    (d) gluing said cured left and right rear branches together at respective abutting surfaces thereof to form an integral rear fork;
    (e) adjoining said integral rear fork to said uncured front frame portion with a plurality of third prepreg layers, wherein said third prepreg layers overlap either or both of said cured left and right rear branches and said uncured front frame portion, each of said third prepreg layers contains a fibrous material impregnated with a curable synthetic resin; and
    (f) heating and curing said uncured front frame portion inside a second mold to form a single-rear-fork bicycle frame
    (g) wherein said left and right rear branches are formed to contain one of a cross-shaped matching protrusion or recess, respectively, on said abutting surfaces thereof during step (a) so as to enhance an integrity of said integral rear fork.

2. A process for making single-rear-fork bicycle frames according to claim 1, wherein said uncured hollow front frame portion is formed by the following steps:
    (a) overlapping a plurality of second prepreg layers on a second mandrel assembly to form an uncured front frame portion, which contains a central main and a plurality of hollow legs connected thereto, each of said second prepreg layers containing a fibrous material impregnated with a curable synthetic resin;
    (b) removing said uncured front frame portion from said second mandrel assembly to form said uncured hollow front frame portion.

3. A process for making single-rear-fork bicycle frames according to claim 1, wherein said uncured hollow front frame portion is formed by overlaying a plurality of long strips or patches of said second prepreg layers on a plurality of tubes, said tubes being arranged in a radiation manner from said hollow central main.

4. A process for making single-rear-fork bicycle frames according to claim 3, wherein said tubes are arranged in a "Y", "V", "T" or "7" shape and adjoined by said overlapping layers of said prepreg layers.

5. A process for making single-rear-fork bicycle frames according to claim 1, wherein said uncured left rear branch and said uncured right rear branch are cured by the steps of:
    (a) inserting an inflatable bladder inside each of said uncured branches;
    (b) blowing air into said inflatable bladder so as to press said uncured branch against an inner wall of said first mold; and
    (c) applying heat to cure said curable synthetic resin.

6. A process for making single-rear-fork bicycle frames according to claim 1, wherein said uncured left rear branch and said uncured right rear branches are cured by the steps of:
    (a) inserting a heat-foamable material into each of said uncured branch; and
    (b) applying heat to cure said curable synthetic resin.

7. A process for making single-rear-fork bicycle frames according to claim 1, wherein said cured rear fork has a recessed front portion about 2 to 4 cm deep which is sleevedly received by said uncured front frame portion so as to form a flush adjoined external surface.

8. A process for making single-rear-fork bicycle frames according to claim 1, wherein said rear fork is connected to one end of one of said legs but not to said central main.

9. A process for making single-rear-fork bicycle frames according to claim 8, wherein:
    (a) said steering support means is formed by wrapping a steering tube with at least a fourth prepreg layer, said seat support means is formed by wrapping a seat tube with at least a fifth prepreg layer, and said pedal support means is formed by wrapping a pedal tube with at least sixth prepreg layer.

10. A process for making single-rear-fork bicycle frames according to claim 9, wherein said uncured front frame portion is cured by the steps of:

(a) inserting at lease one inflatable bladder inside said uncured front frame portion;

(b) blowing air into said inflatable bladder via air hose which is connected to an external air supply through said head tube or said seat tube so as to press said uncured branch against an inner wall of said first mold; and (c) applying heat to cure said curable synthetic resin.

11. A process for making single-rear-fork bicycle flames according to claim 10, wherein two inflatable bladders are inserted inside said uncured front frame portion, and air is blown into said inflatable bladders via air hoses which are connected to an external air supply through said head tube and said seat tube, respectively.

12. A process for making single-rear-fork bicycle frames according to claim 1, wherein said uncured front frame portion is cured by the steps of:

(a) inserting a heat-foamable material into each of said uncured branch; and (b) applying heat to cure said curable synthetic resin.

13. A process for making single-rear-fork bicycle frames according to claim 1, wherein said left rear branch and said right rear branch are glued by an adhesive layer of about 0.1 to 1.0 mm thick.

* * * * *